April 11, 1967 E. O. P. TATTER ETAL 3,313,547

RECORD CHANGER

Filed Dec. 20, 1963 3 Sheets-Sheet 1

INVENTORS:
Ernest O. P. Tatter
Jack Bell
By
Hofgren, Wegner, Allen, Stellman & McCord
Attys April 11, 1967 E. O. P. TATTER ETAL 3,313,547

RECORD CHANGER

Filed Dec. 20, 1963 3 Sheets-Sheet 3

United States Patent Office 3,313,547

Patented Apr. 11, 1967

3,313,547

RECORD CHANGER

Ernest O. P. Tatter, Addison, and Jack Bell, Roselle, Ill., assignors to Warwick Electronics Inc., a corporation of Delaware Filed Dec. 20, 1963, Ser. No. 332,002
7 Claims. (Cl. 274—47)

This invention relates to record changers, and, more particularly, to a record changer having means providing an air blast for cleaning the stylus carried by the tone arm.

An object of this invention is to provide a new and improved record changer in which the stylus is cleaned without actual contact therewith whereby the life of the stylus is lengthened as well as the life of records due to the use of a clean stylus.

Another object of the invention is to provide a record changer in which a tone arm having a stylus has a rest position to one side of a turntable to permit changing of records with means for delivering a blast of air against the stylus when the tone arm is at the rest position to remove dirt and other foreign material from the stylus preparatory to playing the next record.

Another object of the invention is to provide a record changer as defined in the preceding paragraph in which air is only utilized when the tone arm is at or adjacent the rest position and the air blast is supplied by a bellows connected to a nozzle with the bellows being operated in timed relation during the record change cycle by the operating mechanism for moving the tone arm.

Still another object of the invention is to provide structure for directing a blast of air against a tone arm stylus when the tone arm is at a rest position, in which the air blast is directed at an angle against the stylus to have a dislodging effect with respect to foreign material on the stylus and with the air blast being provided by a simple air pump operated by the normal record change cycle mechanism of the record changer.

Further objects and advantages will become apparent from the following detailed description taken in connection with the accompanying drawings in which.

Figure 1:
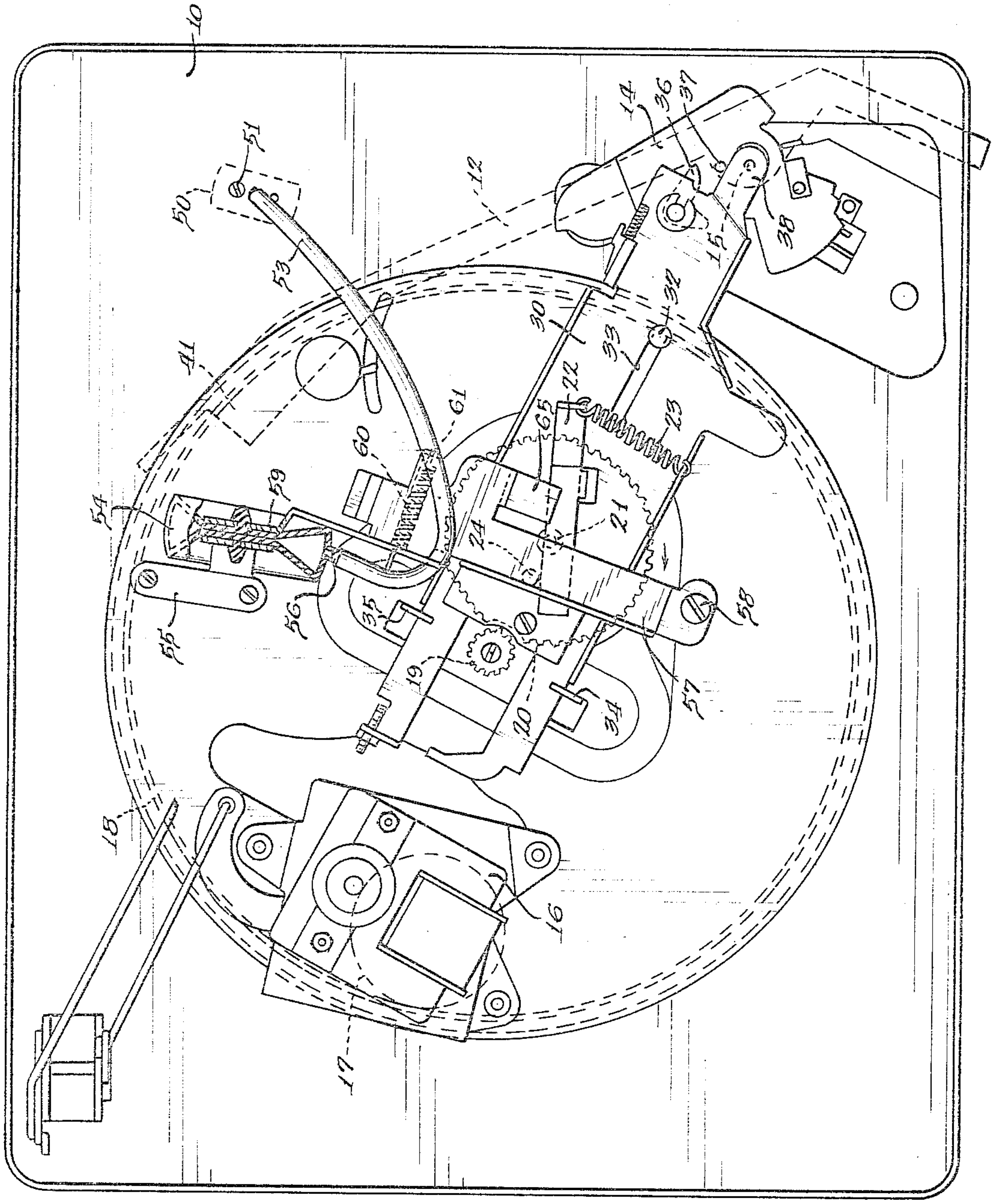
FIGURE 1 is a bottom plan view of the record changer with parts broken away and showing the air pump bellows partly in section, and with the tone arm shown in record playing position in broken line and with the change cycle mechanism inactive.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Parts of the record changer as shown in the drawings are of generally conventional construction and general reference will be made thereto to facilitate an understanding of the invention. Referring to FIGURE 3, a record changer motorboard 10 rotatably mounts a turntable 11 positioned within a central well in the motorboard and a tone arm 12 mounted at a corner of the motorboard for movement about a vertical axis between positions overlying the turntable as shown in broken line in FIGURE 1 and a rest position as shown in broken line in FIGURE 2. The rest position for the tone arm is that position that the tone arm takes when a record change cycle is occurring. As is well known, an upstanding post 13 mounts the tone arm for movement. The tone arm 12 has a sleeve (not shown) extending downwardly through the post and at its lower end is connected to a set down cam 14 which is rotatable with the tone arm. A vertically movable pin 15 extends through the sleeve to a position of engagement with the tone arm whereby the elevation of the pin 15 controls the elevation of the tone arm.

The operation of the tone arm in a record change cycle is derived from record change cycle mechanism powered through a motor 16 which, through change speed pulleys, drives an idler wheel 17 engageable with a flange 18 of the turntable. Thus, rotation of the turntable results in driving a gear 19 at the hub of the turntable which can selectively engage a driven gear 20 which is rotatably mounted on the underside of the motorboard 10 by a rotatable mounting pin 21.

During the playing of a record, the driven gear 20 is held against rotation by suitable detent means, part of which is shown as including a pivoted lever 22 urged by a spring 23 against a drive pin 24 which is carried on the driven gear 20 and extends downwardly therefrom. As is known in the art, velocity trip mechanism operable by the tone arm 12 at the completion of playing of a record will function to bring the driven gear 20 into geared relation with the drive gear 19 which is rotating with the turntable to operate the driven gear 20 through one revolution. In operating through this revolution, the drive pin 24 on the driven gear will cause a back and forth movement of the main operating member 30 by the pin engaging in a slot 31 in the main operating member and with the main operating member being guided in its movement by a pin and slot connection 32, 33, as well as a pair of guide brackets 34 and 35 extending down from the motorboard 10.

Figure 2:
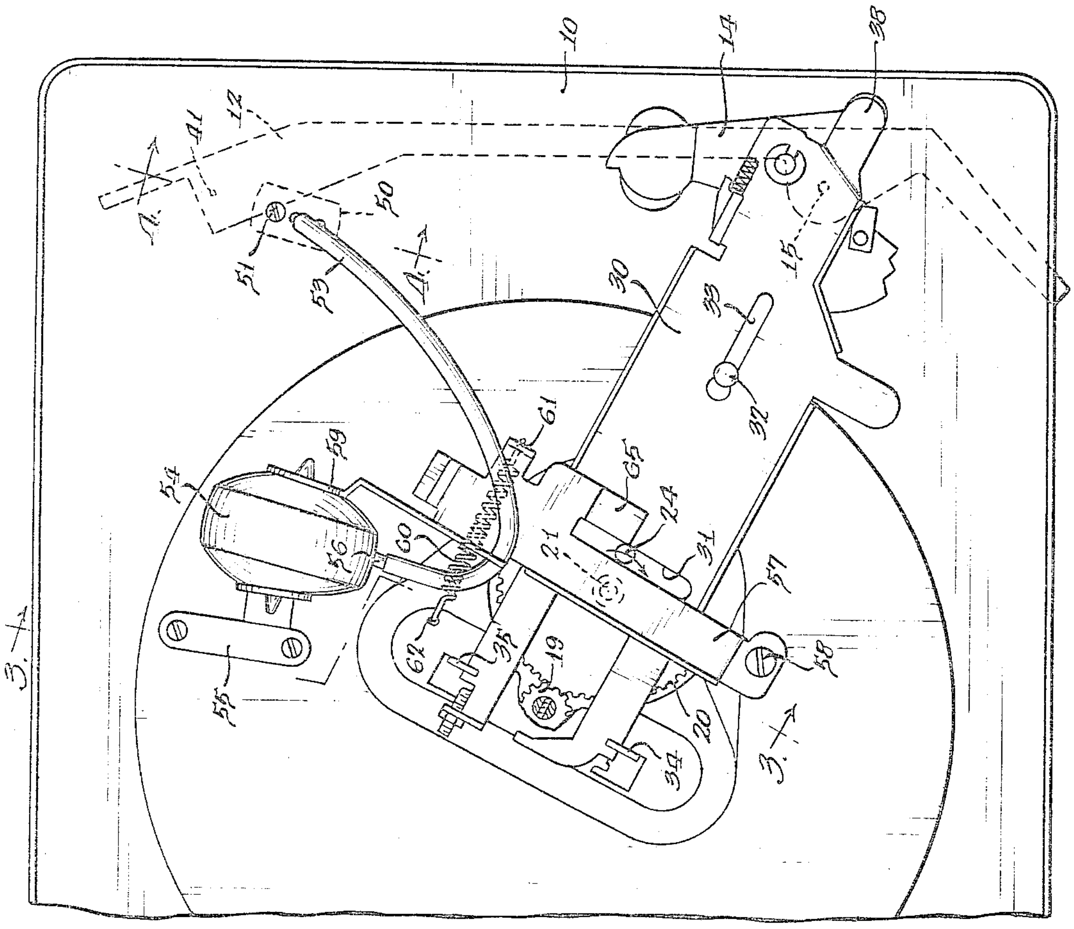
FIGURE 2 is a fragmentary bottom plan view similar to FIGURE 1, showing the tone arm in broken line at its rest position and with the change cycle mechanism positioned immediately prior to delivery of an air blast to the stylus of the tone arm.
Figures 3, 4:
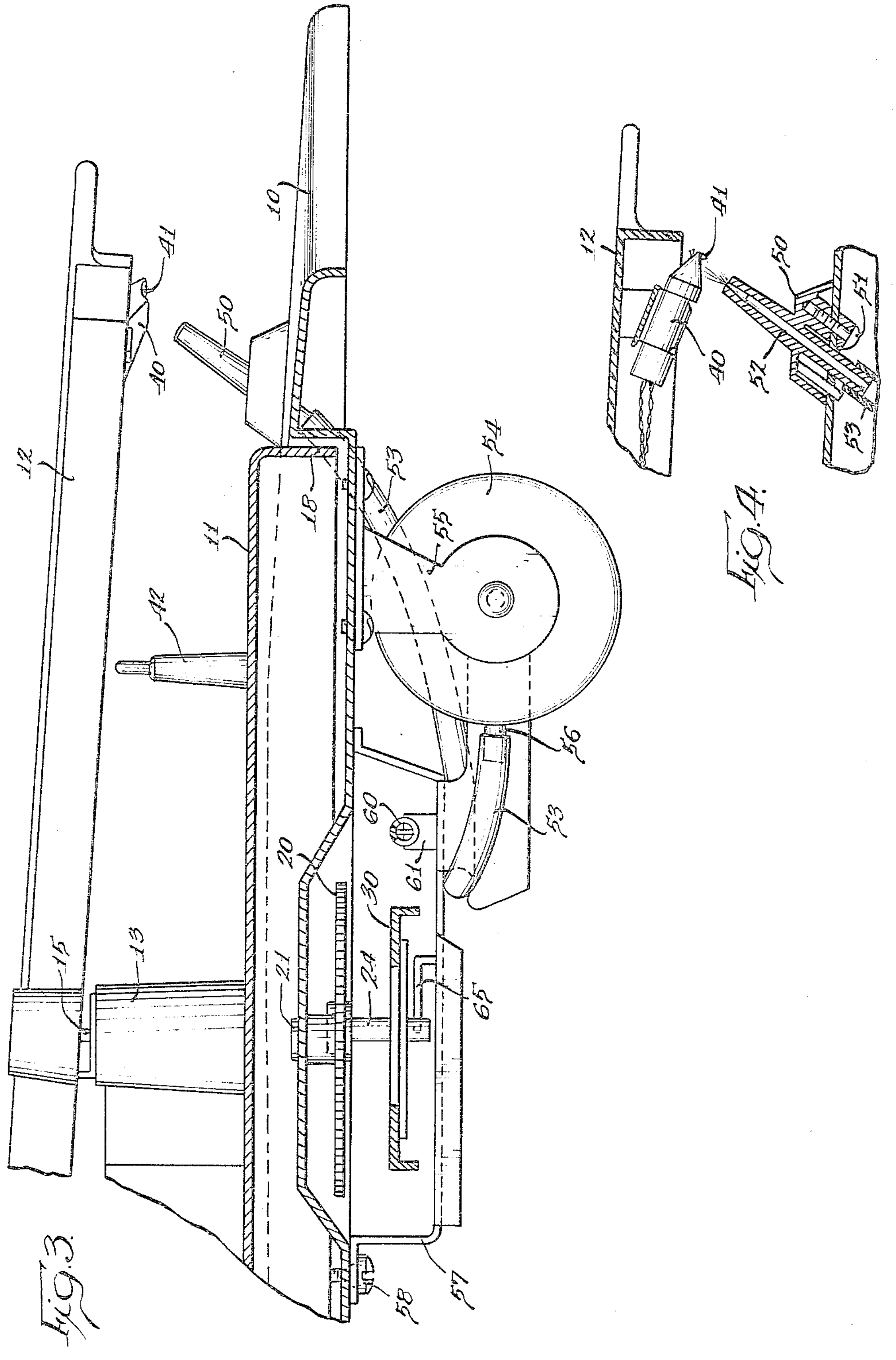
FIGURE 3 is a vertical section taken generally along the line 3—3 of FIGURE 2 and on an enlarged scale.
FIGURE 4 is a fragmentary vertical section on a further enlarged scale taken generally along the line 4—4 in FIGURE 2.

As the drive pin 24 causes the operating member 30 to move outwardly, a pivoted clutch dog 36 on the operating member engages a pin 37 on the set down cam 14 to move the tone arm 12 from the position shown in FIGURE 1 to that shown in FIGURE 2. Subsequently, as the main operating member 30 is moved inwardly back to its original position, the clutch dog 36 will function, by engaging pin 37, to return the tone arm 12 back to a set down position, depending upon the size of the record to be played and determined by record size sensing mechanism, not shown. The clutch dog 36 is frictionally held in position on the operating member so that it can release the pin 37 on the set down cam when the tone arm is properly located at its set down position. Also, during the outward movement of the main operating member 30, a sloped cam 38 at the end thereof operates on the vertically movable pin 15 to raise the tone arm and maintain the tone arm raised until the tone arm 12 has returned to the proper set down position with the sloped cam leaving the pin, resulting in the descent of the tone arm onto a record to be played.

The tone arm 12 carries a cartridge 40 having one or more styli 41 with one stylus extending downwardly. A support 42 is mounted on the motorboard and positioned for support of the tone arm when the record changer is shut off.

The foregoing structure is generally conventional and has been described to render more clear the structure associated with the record changer embodying the invention.

The air blast system includes a nozzle member 50 mounted to a motorboard 10 and secured thereto by suitable means such as a bolt 51 and having an internal air passage 52 which is connected by a length of tubing 53 to an air pump in the form of a bellows 54. The bellows 54 is secured to the underside of the motorboard by a bracket 55 and has an outlet 56 connected to the tubing 53. The bellows 54 is operated in a slow expanding movement and in a fast compression movement to deliver an air blast onto the styli 41 by means of a lever 57 pivoted to the underside of the motorboard at 58. The lever 57 extends across and beneath the main operating member 30 to have an end 59 thereof connected to one side of the bellows. The operating lever 57 is urged in a direction to press the bellows by a spring 60 connected between a flange 61 on the lever 57 and the motorboard, as indicated at 62.

The plane of the operating lever 57 is at a level beneath the end of the drive pin 24 on driven gear 20, as seen in FIGURE 3. However, a leg 65 of the operating arm is positioned at a higher level to be contacted by the drive pin 24. Thus, with the drive parts moving from their rest position, the drive pin 24 will contact the leg 65 of the operating arm to move the arm through a cycle to operate the bellows, with the movement of the drive pin 24 off the end of leg 65 permitting a quick snap return of the operating lever 57 as caused by the spring 60 which has been placed under tension by the initial movement of the operating lever 57.

In operation, when a record change cycle begins the driven gear 20 commences rotation and the drive pin 24 starts the main operating member 30 moving outwardly to move the tone arm 12 to the outer rest position, as shown in broken line in FIGURE 2. During this movement, drive pin 24 contacts the leg 65 of the operating lever for the bellows 54. This swings the operating arm in a clockwise direction, as viewed in FIGURES 1 and 2, to expand the bellows 54 to the condition shown in FIGURE 2. The fully extended condition of the bellows is shown in FIGURE 2 and at this time the tone arm 12 is at or adjacent the rest position generally overlying the air blast nozzle 50. With slight further rotation of the driven gear 20 from the position shown in FIGURE 2, drive pin 24 moves beyond the leg 65 to clear its obstructing relation with the operating lever 57 so that the spring 60 can quickly move the arm in a counterclockwise direction and rapidly compress the bellows 54 to deliver a blast of air out of the nozzle 50 and against the stylus 41 with the air blast being delivered at an angle to facilitate removal of dust and other foreign particles from the stylus.

Continued rotation of the driven gear 20 causes the drive pin 24, by engaging the slot 31 on the main operating member, to return the latter member to its initial position and simultaneously return the tone arm 12 to the proper set down position preparatory to record play.

From the foregoing description it will be evident that cleaning mechanism has been provided in which air is utilized for cleaning of a stylus or styli in an economical manner whereby the air is only required when the tone arm is at a certain position. The air is provided by a simple air pump in the form of a bellows which is easily operated from mechanism normally found in a record changer which provides the proper timed operation of the air blast with the positioning of the tone arm. This stylus cleaning operation is repeated automatically during each cycle and including after the last record has been played.

We claim:

1. A record changer with stylus cleaning means comprising, a motorboard, a turntable rotatably mounted on said motorboard, a tone arm movably mounted on the motorboard for movement between positions overlying the turntable and a rest position to one side of the turntable during a record change cycle, a stylus carried by said tone arm, record change cycle means for moving said tone arm to said rest position including a main operating member, a rotatable pin driven by the turntable for moving said main operating member, and means for directing an air blast against said stylus including a nozzle mounted on said motorboard and directed upwardly at an angle toward said stylus when at said rest position, a bellows mounted to said motorboard and connected to said nozzle by tubing, and means for expanding and compressing said bellows in timed relation with the tone arm including an arm pivotally mounted on the motorboard and engageable with the bellows, spring means urging said arm toward the bellows, and means on said arm engageable by said pin for moving said arm in a direction to expand the bellows and tension the spring means whereby release of said arm by the pin permits a quick compression of the bellows.

2. A record changer with stylus cleaning means comprising, a motorboard, a turntable rotatably mounted on said motorboard, a tone arm movably mounted on the motorboard for movement between positions overlying the turntable and a rest position to one side of the turntable during a record change cycle, a stylus carried by said tone arm, record change cycle means for moving said tone arm to said rest position including a main operating member, a rotatable pin driven by the turntable for moving said main operating member, and means for directing an air blast against said stylus including a nozzle mounted on said motorboard and directed upwardly at an angle toward said stylus when at said rest position, a bellows connected to said nozzle, and means compressing said bellows in timed relation with the tone arm including an arm pivotally mounted on the motorboard and engageable with the bellows, spring means urging said arm toward the bellows, and means for moving said arm in a direction away from the bellows and to tension the spring means whereby release of said arm permits a quick compression of the bellows.

3. A record changer with stylus cleaning means comprising, a motorboard, a turntable rotatably mounted on said motorboard, a tone arm movably mounted on the motorboard for movement between positions overlying the turntable and a rest position to one side of the turntable during a record change cycle, a stylus carried by said tone arm, record change cycle means for moving said tone arm to said rest position including a main operating member, and means for directing an air blast against said stylus including a nozzle mounted on said motorboard and directed upwardly toward said stylus when at said rest position, a bellows connected to said nozzle, an arm pivotally mounted on the motorboard and engageable with the bellows, spring means urging said arm toward the bellows, and means for operating said main operating member and arm in timed relation for moving said arm in a direction to expand the bellows and tension the spring means as the tone arm moves toward rest position with release of said arm permitting a quick compression of the bellows to direct an air blast from the nozzle when the tone arm is at the rest position.

4. In a record changer having a record change cycle mechanism, a motorboard for rotatably supporting a turntable and a tone arm with stylus movable in response to said record change cycle mechanism between a rest position beyond the turntable and record playing positions overlying the turntable, an air nozzle located at the tone arm rest position for directing air applied thereto toward the tone arm stylus, an air discharge device connected to said nozzle, and mechanical means operable in response to said record change cycle mechanism when the tone arm is at the rest position for operating said air discharge device to apply a blast of air to the nozzle and operable during the movement of the tone arm between the record playing positions and the rest position in response to said record change cycle mechanism for conditioning said air discharge device for an air blast operation.

5. In a record changer having a record change cycle mechanism, a motorboard for rotatably supporting a turntable and a tone arm with stylus movable in response to said record change cycle mechanism between a rest position beyond the turntable and record playing positions overlying the turntable, an air nozzle located at the tone arm rest position for directing air applied thereto toward the tone arm stylus, a compressible air discharge device connected to said nozzle, and means operable when the tone arm is at the rest position for compressing said device to apply a blast of air to the nozzle and operable during movement of the tone arm between the record playing positions and the rest position in response to said record change cycle mechanism for causing said device to be filled with air.

6. In a record changer having a record change cycle mechanism, a motorboard for rotatably supporting a turntable and a tone arm with stylus movable in response to said record change cycle mechanism between a rest position beyond the turntable and record playing positions overlying the turntable, an air nozzle located at the tone arm rest position for directing air applied thereto toward the tone arm stylus, an air container connected to said nozzle, and mechanical means operable in response to said record change cycle mechanism when the tone arm is at the rest positon for expelling air from said container to apply a blast of air to the nozzle and operable during movement of the tone arm between the record playing positions and the rest position in response to said record change cycle mechanism for causing said container to be filled with air.

7. In a record changer having a record change cycle mechanism, a motorboard for rotatably supporting a turntable and a tone arm with stylus movable in response to said record change cycle mechanism between a rest position beyond the turntable and record playing positions overlying the turntable, an air nozzle located at the tone arm rest position for directing air applied thereto toward the tone arm stylus, a bellows connected to said nozzle, and means operable when the tone arm is at the rest position for compressing the bellows to apply a blast of air to the nozzle and operable during movement of the tone arm between the record playing positions and the rest position in response to said record change cycle mechanism for causing the bellows to be filled with air.

References Cited by the Examiner

UNITED STATES PATENTS

| | | | |
|---|---|---|---|
| 2,509,307 | 5/1950 | Modera | 274—47 |
| 2,955,825 | 10/1960 | Staar | 274—47 |
| 3,162,445 | 12/1964 | Henry | 274—47 |

FOREIGN PATENTS

| | | |
|---|---|---|
| 971,147 | 12/1958 | Germany. |

NORTON ANSHER, *Primary Examiner.*

JOHN M. HORAN, *Examiner.*

C. B. PRICE, J. F. PETERS, *Assistant Examiners.*